United States Patent
Weinstein et al.

(10) Patent No.: US 7,996,418 B2
(45) Date of Patent: Aug. 9, 2011

(54) SUGGESTING LONG-TAIL TAGS

(75) Inventors: Alex David Weinstein, Seattle, WA (US); Dmitry Yevgenyevich Ryabkov, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 559 days.

(21) Appl. No.: 12/113,187

(22) Filed: Apr. 30, 2008

(65) Prior Publication Data
US 2009/0276437 A1 Nov. 5, 2009

(51) Int. Cl.
*G06F 7/00* (2006.01)
(52) U.S. Cl. ........................ 707/767; 707/673
(58) Field of Classification Search .................. 707/767, 707/673
See application file for complete search history.

(56) References Cited

U.S. PATENT DOCUMENTS

| | | | |
|---|---|---|---|
| 7,216,121 B2 | 5/2007 | Bachman et al. | |
| 7,296,223 B2 | 11/2007 | Chidlovskii et al. | |
| 7,739,304 B2* | 6/2010 | Naaman et al. | 707/784 |
| 7,844,589 B2* | 11/2010 | Wang et al. | 707/706 |
| 7,870,117 B1* | 1/2011 | Rennison | 707/706 |
| 7,885,904 B2* | 2/2011 | Aravamudan et al. | 706/11 |
| 2006/0106814 A1 | 5/2006 | Blumenau et al. | |
| 2007/0016575 A1 | 1/2007 | Hurst-Hiller et al. | |
| 2007/0028171 A1 | 2/2007 | MacLaurin | |
| 2007/0078832 A1* | 4/2007 | Ott et al. | 707/705 |
| 2007/0118509 A1 | 5/2007 | Svendsen | |
| 2007/0150487 A1 | 6/2007 | Christian et al. | |
| 2007/0174247 A1 | 7/2007 | Xu et al. | |
| 2007/0271498 A1 | 11/2007 | Schachter | |
| 2008/0195664 A1* | 8/2008 | Maharajh et al. | 707/104.1 |
| 2008/0201225 A1* | 8/2008 | Maharajh et al. | 705/14 |
| 2009/0094189 A1* | 4/2009 | Stephens | 707/705 |
| 2010/0007044 A1* | 1/2010 | Jacob et al. | 264/219 |
| 2010/0046842 A1* | 2/2010 | Conwell | 382/218 |
| 2010/0057555 A1* | 3/2010 | Butterfield et al. | 705/14.41 |
| 2010/0281011 A1* | 11/2010 | Santi et al. | 707/706 |
| 2011/0055192 A1* | 3/2011 | Tang et al. | 707/706 |

OTHER PUBLICATIONS

Sanjay Sood et al., "TagAssist: Automatic Tag Suggestion for Blog Posts," ICWSM 2007. pp. 1-7.*
Basile, et al., "Recommending Smart Tags in a Social Bookmarking System", retrieved at <<http://www.kde.cs.uni-kassel.de/ws/eswc2007/proc/RecommendingSmartTags.pdf>>, 2007, pp. 22-29.
Vojnovic, et al., "Ranking and Suggesting Popular Items", retrieved at <<http://research.microsoft.com/~milanv/popularity.pdf>>, pp. 10.
"ZoneTag Photos", Yahoo! Inc., 2006, pp. 5.

\* cited by examiner

*Primary Examiner* — John R. Cottingham
*Assistant Examiner* — Alexandria Y Bromell
(74) *Attorney, Agent, or Firm* — Hope Baldauff Hartman, LLC

(57) ABSTRACT

Technologies are described herein for suggesting long-tail tags. A first group of tags and a second group of tags are identified from a plurality of tags. The first group of tags includes frequently-assigned tags having a higher frequency of being assigned to an asset. The second group of tags includes long-tail tags having a lower frequency of being assigned to the asset than the frequently-assigned tags. The frequently-assigned tags and a sample of the long-tail tags are suggested to a user upon receiving a request from the user to tag the asset.

12 Claims, 5 Drawing Sheets

SUGGESTING LONG-TAIL TAGS

BACKGROUND

Computer networks (hereinafter "networks"), such as local area networks ("LANs"), wide area networks ("WANs"), and the Internet, provide a convenient and efficient way for users at remote locations to communicate and to share assets. As used herein, an asset may refer to any suitable information that can be shared over a network. For example, an asset may include multimedia content, such as text, images, audio, video, and combinations thereof. Users may share an asset through client-side applications as well as server-side applications. A client-side application may utilize a suitable peer-to-peer protocol to enable communications between users over a network without a server computer. In this case, each client computer stores the assets. In contrast, a server-side application may utilize a central server, which stores the assets and facilitates communications between remote client computers. The central server may also be used by an asset provider to provide or sell assets to users.

As assets shared over a network continue to accumulate over time, the ability to organize, browse, and search for specific assets becomes a useful, if not necessary, feature for users. One way to classify assets is to associate a tag (i.e., one or more keywords) with each asset. In this way, a user can browse and search for an asset based on its associated tags. Tags may be generated by a content provider and/or generated by users. By allowing users to generate tags, more relevant tags may be generated because the users who generate the tags will likely be the same users who browse and search for specific assets based on the tags. That is, the users who request and utilize the assets have an interest in creating appropriate and useful tags for the assets.

When tags are generated, users typically have an option to enter a new tag and/or an option to select a previously generated tag, such as tags created by asset providers and users. Instead of displaying an exhaustive list of tags, many tag interfaces are adapted to suggest only the tags that are most frequently assigned to an asset. While this approach displays the most popular tags, it eliminates the introduction of so-called "long-tail" tags that are rarely assigned but in some cases are highly relevant or useful. By suggesting only the most frequently-assigned tags, these tag interfaces significantly reduce the chance that the long-tail tags will be assigned to the asset.

It is with respect to these considerations and others that the disclosure made herein is presented.

SUMMARY

Technologies are described herein for suggesting long-tail tags. In particular, through the utilization of the technologies and concepts presented herein, a tag interface is adapted to suggest long-tail tags along with frequently assigned tags. A user interacting with the tag interface can select one of the suggested tags to assign to a given asset. As used herein, long-tail tags refer to a group of tags between a group of frequently-assigned tags on one end of a spectrum and a group of rarely-assigned tags on the other end of the spectrum. Conventional tag interfaces generally ignore these long-tail tags, which may include highly relevant and useful tags.

Embodiments disclosed herein provide a tag interface that is adapted to display not only the frequently-assigned tags, but also a sample of long-tail tags. In this way, the long-tail tags, which would otherwise remain unknown in conventional tag interfaces, are suggested to users and thus have the opportunity to be assigned to an asset. While frequently-assigned tags may provide relevant and accurate information about the asset, in many cases frequently-assigned tags are too generic to be useful. Further, while some long-tail tags may be irrelevant, other long-tail tags may be considered "hidden gems" (i.e., unknown but highly relevant and useful tags). These hidden gems may include, but are not limited to, relatively new tags entered by users as well as innovative tags that have not been considered by users. By providing users with a suggestion of long-tail tags along with the frequently-assigned tags, the tag interface disclosed herein provides a user the opportunity to consider a sample of long-tail tags and to find a hidden gem, if one exists, in the sample of long-tail tags.

According to one aspect presented herein, a computer program is provided for suggesting long-tail tags. The computer program identifies a first group of tags and a second group of tags from a plurality of tags. The first group of tags includes frequently-assigned tags having a higher frequency of being assigned to an asset. The second group of tags includes long-tail tags having a lower frequency of being assigned to the asset than the frequently-assigned tags. The computer program suggests the frequently-assigned tags and a sample of the long-tail tags upon receiving a request from the user to tag the asset.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
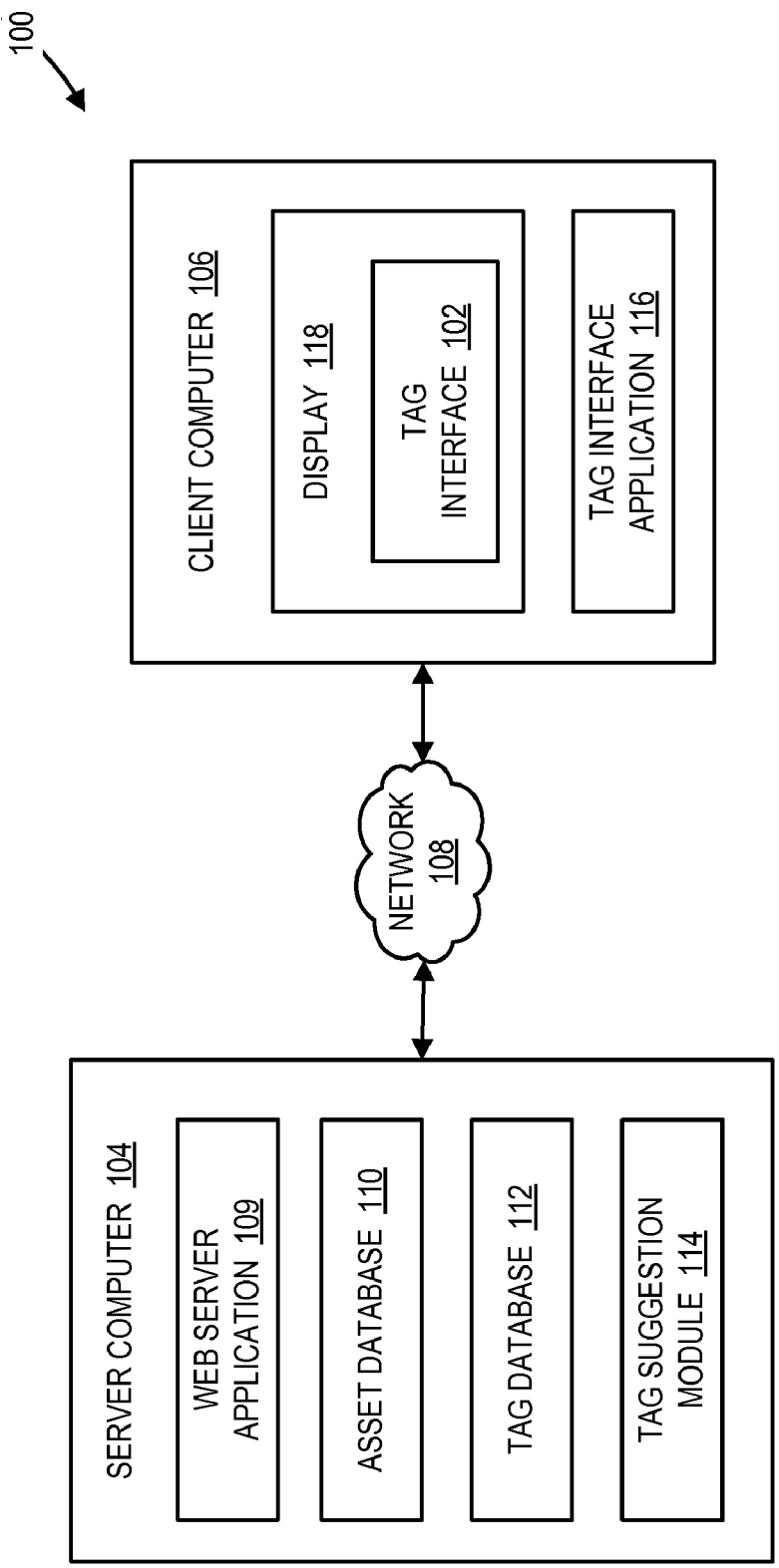
FIG. 1 is a network architecture diagram showing aspects of a tag interface capable of suggesting long-tail tags when a user requests to tag an asset, in accordance with one embodiment.

The following detailed description is directed to technologies for suggesting long-tail tags. Through the utilization of the technologies and concepts presented herein, a tag interface is adapted to suggest long-tail tags along with frequently assigned tags. A user interacting with the tag interface can select one of the suggested tags to assign to a given asset. As used herein, long-tail tags refer to a group of tags between a group of frequently-assigned tags on one end of a spectrum and a group of rarely-assigned tags on the other end of the spectrum. That is, long-tail tags may refer to tags that are not as popular as the frequently-assigned tags, but are assigned at a higher frequency than rarely assigned tags.

Embodiments disclosed herein provide a tag interface that is adapted to display not only the frequently-assigned tags, but also a sample of long-tail tags. The sample of long-tail tags suggested for display on a tag interface may be selected based on a probabilistic selection mechanism. In one embodiment, the probabilistic selection mechanism provides each long-tail tag an opportunity to be suggested along with frequently-assigned tags. Conceptually, long-tail tags given a chance to be suggested may be included in a "window." As used herein, a window refers to conceptual representation of a group of tags. Exemplary groupings may include a frequently-assigned tag window containing frequently-assigned tags, a long-tail tag window containing long-tail tags, and a rarely-assigned tag window containing rarely-assigned tags. Although embodiments disclosed herein primarily refer to mutually exclusive groupings, it should be appreciated that the groupings may not be mutually exclusive in other embodiments.

After a given number of chances, a tag may slide out of one window and enter another window. For example, a tag that has been suggested a given number of times may slide out of long-tail tag window because the tag has been assigned to an asset at a higher frequency than a first threshold. In this case, the tag may be assigned at a high enough frequency to be considered a frequently-assigned and thereby enter the frequently-assigned tag window. In one embodiment, the first threshold is a minimum number of times for a tag to be assigned to an asset in order to be considered a frequently-assigned tag. Further, a tag that has been suggested a given number of times may slide out of long-tail tag window because the tag has been assigned to an asset at a lower frequency than a second threshold. In this case, the tag may be assigned at a low enough frequency to be considered a rarely-assigned tag and thereby enter the rarely-assigned tag window. In one embodiment, the second threshold is a maximum number of times for a tag to be assigned to an asset in order to be considered a rarely-assigned tag.

It should be appreciated that the first threshold and the second threshold may be defined in terms of absolute counts of assignments or in terms of comparing counts between multiple tags. For example, the first threshold may specify that a tag assigned to an asset more than a hundred times is a frequently-assigned tag. Alternatively, the first threshold may specify that only the top thirty percent of tags with the highest counts, regardless of the absolute number, are considered frequently-assigned tags.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for determining long-tail tags will be described. FIG. 1 will be described, which shows aspects of a simplified network architecture 100 for providing a tag interface 102 adapted to suggest long-tail tags as well as frequently-assigned tags. In this way, relevant long-tail tags are provided an opportunity to be discovered by users and subsequently assigned to assets. The network architecture 100 includes a server computer 104 and a client computer 106 operatively coupled to the server computer 104 via a network 108. The network 108 may be any suitable network, such as a local area network ("LAN") or the Internet. The server computer 104 and the client computer 106 may communicate over the network 108 via a web server application 109. Although only one client computer 106 is illustrated in FIG. 1, the network architecture 100 may include multiple client computers in any suitable network configuration.

The server computer 104 includes an asset database 110, a tag database 112, and a tag suggestion module 114. The asset database 110 is adapted to store a plurality of assets. As used herein, assets refer to any suitable information, object, or person that may be associated with a tag. For example, an asset may include multimedia content, such as text, images, audio, video, and combinations thereof. Other examples may include hyperlinks and users. Although FIG. 1 illustrates the asset database 110 as part of the server computer 104, it should be appreciated that in other embodiments the asset database 110 may be a remote database accessible by the server computer 104 over the network 108.

The tag database 112 is adapted to store a plurality of tags. The tag database 112 may also include information on the assets to which each tag is assigned. The tag database 112 may further include information on the number of times each tag has been assigned to a given asset. As used herein, a tag refers to one or more keywords that may be associated with an asset. For example, a tag may describe the asset or provide other relevant information about the asset. Tags may be implemented in directories, search engines, and the like to facilitate the identification, organization, and efficient retrieval of assets through the tags. Tags may be created by an organization or by users. Although not so limited, embodiments described herein primarily refer to user-created tags.

In one embodiment, the tag suggestion module 114 determines the tags in the tag database 112 that are long-tail tags. In one embodiment, the tags in the tag database 112 are divided into three groups: frequently-assigned tags, long-tail tags, and rarely-assigned tags. The frequently-assigned tags generally refer to tags that are assigned to a given asset at a relatively higher frequency. The rarely-assigned tags generally refer to tags that are assigned to the given asset at a relatively lower frequency. The long-tail tags generally refer to the tags that are assigned to the given asset at a frequency that is lower than the frequently-assigned tags and higher than the rarely-assigned tags.

Frequently-assigned tags, while usually relevant, may include generic tags that provide little to no substantive information about a given asset. For example, a generic tag, such as "pivot table," does not distinguish between an article for creating a pivot table and an article for manipulating information contained in a pivot table. Rarely-assigned tags may include misspellings, mischaracterizations, and other flaws that prevent these tags from being commonly assigned to the given asset. Long-tail tags, which may include irrelevant tags, may also include rarely seen but highly relevant tags that have not been assigned to the given asset for a variety of reasons. In one example, a long-tail tag may be an inventive tag that is not contemplated by other users. In another example, a long-tail tag may be a tag recently entered by a user.

In one embodiment, the tag suggestion module 114 is further adapted to select a sample of the long-tail tags for display as a suggestion on the client computer 106. In particular, the selected sample of long-tail tags may be provided to a tag interface application 116, which when executed by a processor, renders the tag interface 102 on a display 118 of the client computer 106. For example, the tag interface application 116 may be a web browser or other suitable application adapted to render suggestions provided by the tag suggestion module 114 via the web server application 109. The tag interface 102 may be adapted to enable a user to view assets stored in the asset database 110 and to assign tags to each of the assets. When the user enters a tag into the tag interface 102, the tag interface 102 may provide a list of suggestions retrieved from the tag suggestion module 114. The list of suggestions may include the sample of long-tail tags as well as a given number of frequently-assigned tags. The user may either select one of the suggestions or manually enter a tag not in the list of retrieved suggestions.

The tag suggestion module 114 may select the sample of long-tail tags by randomly or pseudo-randomly selecting tags from the long-tail tags stored in the tag database 112. Once the tag interface application 116 displays the sample of long-tail tags in the tag interface 102, the tag suggestion module 114 may track a number of times each long-tail tag has been suggested (i.e., the number of chances each long-tail tag has been given), as well as the number of times each long-tail tag is assigned to a given asset.

After a tag is suggested a given number of times, the tag may be removed from the long-tail tag category if the number of times the tag is assigned to an asset exceeds a first threshold. In this case, the tag may be moved to the frequently-assigned tag category if the frequently-assigned tag category and the long-tail tag category are mutually exclusive. In one embodiment, the first threshold is a minimum number of times for a tag to be assigned to an asset in order to be considered a frequently-assigned tag. As previously mentioned, the first threshold may be defined in terms of an absolute count of assignments or in terms of comparing counts between multiple tags (e.g., in terms of percentages).

Further, after a tag is suggested a given number of times, the tag may be removed from the long-tail tag category if the number of times the tag is assigned to an asset falls below a second threshold. In this case, the tag may be moved to the rarely-assigned tag category if the rarely-assigned tag category and the long-tail tag category are mutually exclusive. In one embodiment, the second threshold is a maximum number of times for a tag to be assigned to an asset in order to be considered a rarely-assigned tag. As previously mentioned, the second threshold may be defined in terms of an absolute count of assignments or in terms of comparing counts between multiple tags (e.g., in terms of percentages).

Figure 2:
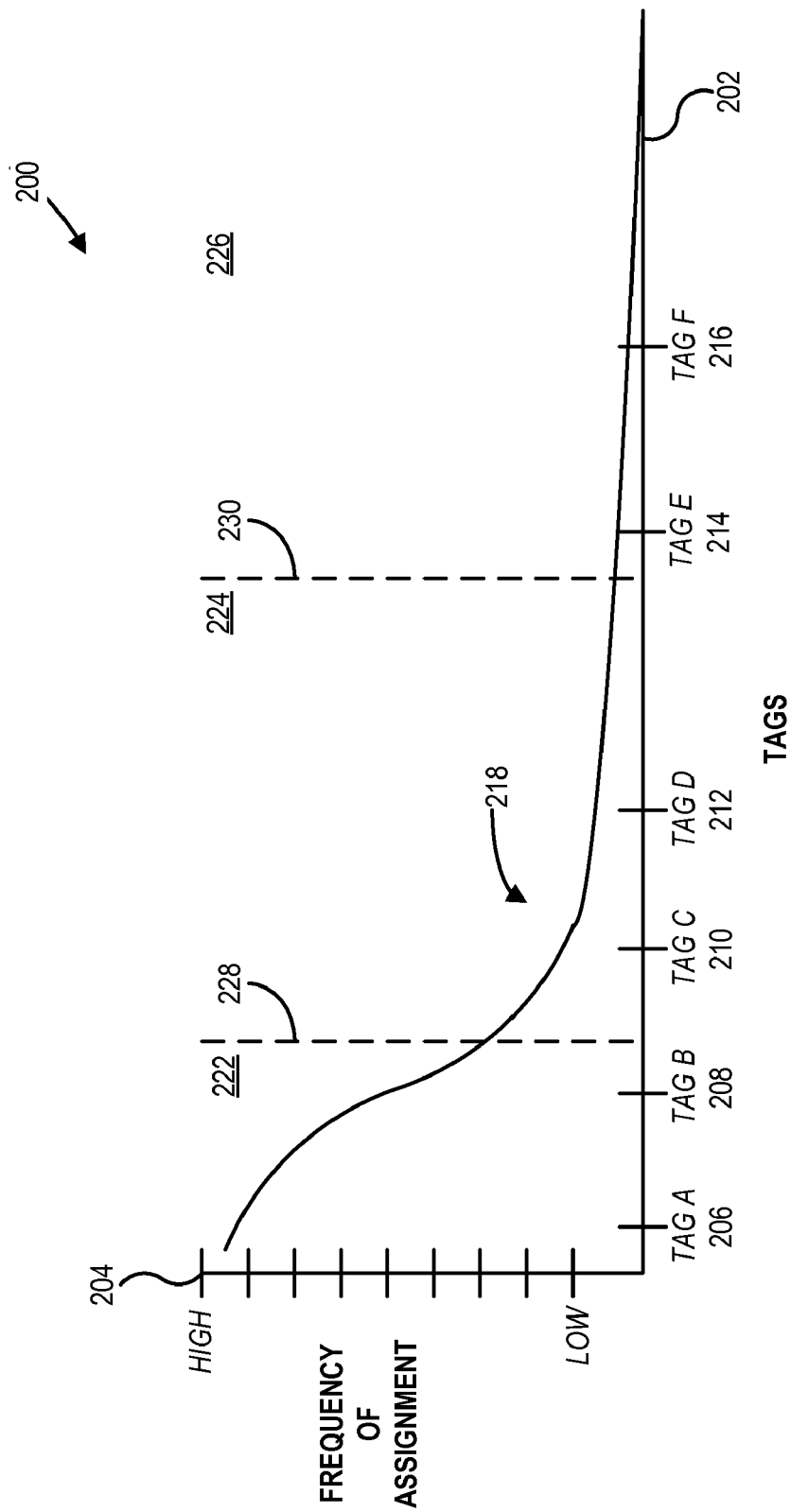
FIG. 2 is a line chart diagram showing aspects of the operation of an illustrative operation of a tag suggestion module, in accordance with one embodiment.

Referring now to FIG. 2, additional details will be provided regarding the operation of the tag suggestion module 114. In particular, FIG. 2 illustrates a line chart diagram 200 showing a relationship between a plurality of tags and a given asset stored in the asset database 110. In particular, an x-axis 202 along the line chart diagram 200 illustrates a plurality of tags, and a y-axis 204 illustrates a number of times each of the plurality of tags along the x-axis 202 has been assigned to the asset. In the example shown in FIG. 2, the x-axis 202 includes a first tag 206, a second tag 208, a third tag 210, a fourth tag 212, a fifth tag 214, and a sixth tag 216. The first tag 206 has the highest frequency of being assigned to a particular asset as indicated by a graph 218. Alternatively, the first tag 206 may have the highest frequency of being assigned to a set of assets. The sixth tag 216 has the lowest frequency of being assigned to the asset as indicated by the graph 218. The tags 208-214 descend in frequency of assignment from the first tag 206 to the sixth tag 216 as indicated by the graph 218.

The line chart diagram 200 is divided into three groups. In particular, the line chart diagram 200 includes a frequently-assigned tag window 222, a long-tail tag window 224, and a rarely-assigned tag window 226. The frequently-assigned tag window 222, which contains frequently-assigned tags, includes the first tag 206 and the second tag 208. The long-tail tag window 224, which contains long-tail tags, includes the third tag 210 and the fourth tag 212. The rarely-assigned tag window 226, which contains rarely-assigned tags, includes a fifth tag 214 and a sixth tag 216. The frequently-assigned tag window 222 and the long-tail tag window 224 are divided by a first threshold line 228. The long-tail tag window 224 and the rarely-assigned tag window 226 are divided by a second threshold line 230.

The first threshold line 228 and the second threshold line 230, which divide the tags 206-216 into the windows 222-226, may be determined by any suitable criteria. In one embodiment, percentages of the tags 206-216 may be used to classify each of the windows 222-226. For example, the frequently-assigned tag window 222 may include the top 30% of the tags 206-216 with the highest frequencies, and the rarely-assigned tag window 226 may include the lowest 25% of the tags 206-216 with the lowest frequencies. Thus, the long-tail tag window 224 includes the middle 45% of the tags 206-216. Other criteria may be similarly implemented as contemplated by those skilled in the art. Further, these criteria may be dynamically adjustable based on the number of tags as well as other factors.

In one embodiment, the tags 210-212 in the long-tail tag window 224 are suggested in the tag interface 102 along with the tags 206-208 in the frequently-assigned tag window 222. As the tags 210-212 are suggested in the tag interface 102, the tag suggestion module 114 may track the number of times the tags 210-212 are assigned to the asset or other related assets. If, for example, the number of times that the third tag 210 is assigned to a given asset exceeds the number of times specified at the first threshold line 228, then the third tag 210 may slide out of the long-tail tag window 224 and enter the frequently-assigned tag window 222. If, for example, the number of times that the fourth tag 212 is assigned to the asset falls below the number of times specified at the second threshold line 230, then the fourth tag 212 may slide out of the long-tail tag window 224 and enter the rarely-assigned tag window 226.

Similarly, the tags 206-208 in the frequently-assigned tag window 222 and the tags 214-216 in the rarely-assigned tag window 226 may also slide out of their respective windows. If, for example, the number of times the second tag 208 is assigned to the asset falls below the number of times specified at the first threshold line 228, then the second tag 208 may slide out of the frequently-assigned tag window 222 and enter the long-tail tag window 224. If, for example, the number of times the fifth tag 214 is assigned to the asset exceeds the number of times specified at the second threshold line 230, then the fifth tag 214 may slide out of the rarely-assigned tag window 226 and enter the long-tail tag window 224.

By regularly ensuring that the tags 206-216 are properly grouped in their respective windows 222-226, the most relevant tags can be suggested to the user through the tag interface 102. In particular, by suggesting the long-tail tags, the tag suggestion module 114 provides the long-tail tags a chance to be discovered by users and assigned to an asset. The regular sliding of the tags 206-216 between the windows 222-226 also facilitates an updated and current grouping of the tags 206-216. In a conventional tag interface, only frequently-assigned tags, such as the tags 206-208, would be suggested to users. As such, while the tags 206-208 are given the opportunity to remain popular, the tags 210-212 would be given little or no opportunity to be assigned to the asset.

Figure 3:
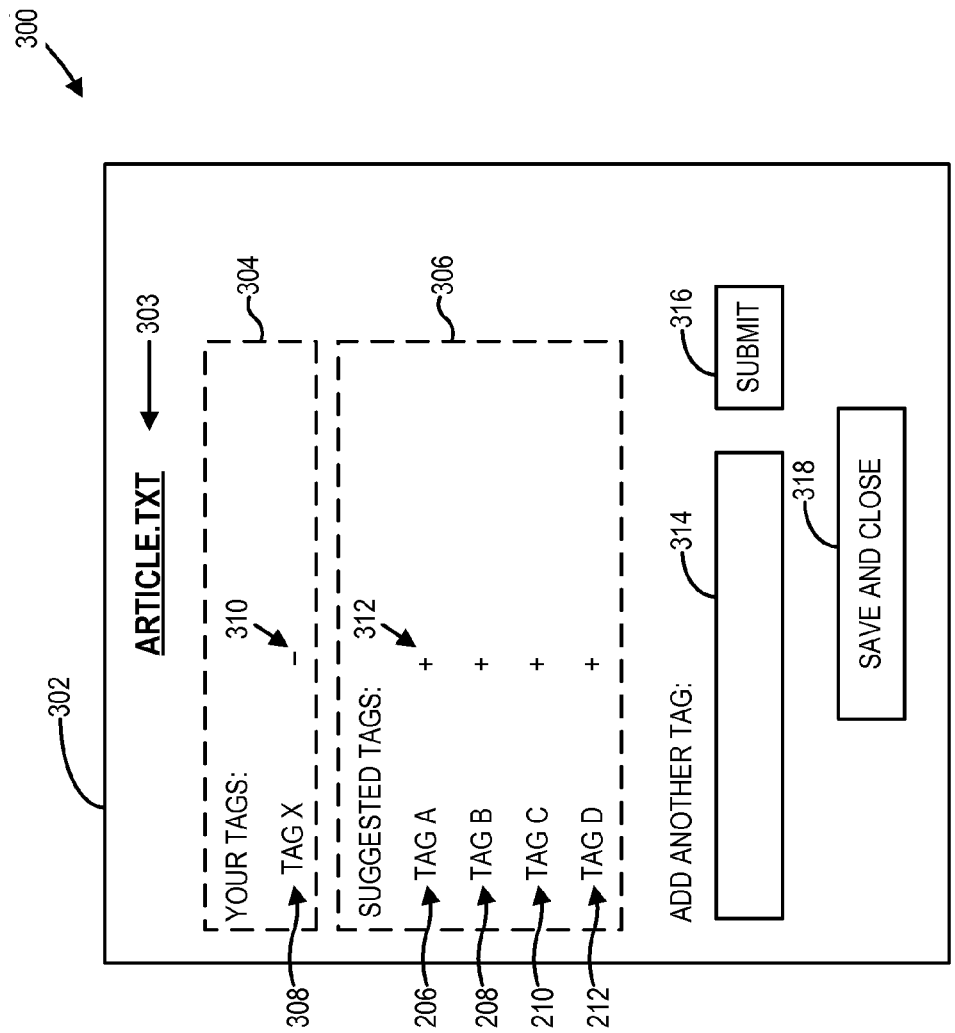
FIG. 3 is a screen display diagram showing an illustrative screen capture of a tag interface, in accordance with one embodiment.

Turning now to FIG. 3, additional details regarding aspects of the tag interface 102 will be provided with reference a screen capture 300. As illustrated in FIG. 3, the screen capture 300 illustrates an exemplary implementation 302 of at least a portion of the tag interface 102 adapted to assign a tag to a file entitled "article.txt" as indicated at 303. The implementation 302 includes a first section 304 and a second section 306 which are indicated by dotted lines. The first section 304 includes tags, such as a previously assigned tag 308, which the user may be assigned to the file "article.txt" through the implementation 302. Beside the previously assigned tag 308 is a delete button 310, which can be selected by the user to delete the previously assigned tag 308. It should be understood that the previously assigned tag 308 is not being deleted from the tag database 112. Rather, user's association of the previously assigned tag 308 to the asset is being removed. The second section 306 includes tags, such as the first tag 206, the second tag 208, a third tag 210, and a fourth tag 212, which are suggested by the tag suggestion module 114. Beside each of the tags 206-212 is an add button 312, which can be selected by the user to add one of the tags 206-212.

As previously mentioned with reference to FIG. 2, the first tag 206 and the second tag 208 are frequently-assigned tags, while the third tag 210 and the fourth tag 212 are long-tail tags. By displaying the long-tail tags in addition to the frequently-assigned tags, the implementation 302 provides a user the opportunity to discover any relevant long-tail tags. For example, if the third tag 210 is more relevant and useful than the first tag 206 and the second tag 208, then the user can select the third tag 210 by selecting the corresponding add button 312. If both the third tag 210 and the fourth tag 212 are irrelevant long-tail tags, then the user can select the first tag 206 or the second tag 208. Alternatively, the user can also manually enter a tag into a tag input element 314. The tag input element 314 may include an auto-complete feature that utilizes the probabilistic selection mechanism as disclosed herein. Upon entering a tag into the tag input element 314, the user may select a submit button 316 to submit the entered tag.

When a user selects one of the add buttons 312 or the submit button 316 to assign a new tag to the file "article.txt", the new tag is displayed in the first section 304. The second section 306 may be updated based on the new tags added to the first section 304. For example, if the first tag 206 is added to the first section 304, the first tag 206 may be removed from the second section 306 to avoid duplication. Also, another suggested tag may be added to the second section 306 to replace the first tag 206. The user can assign any number of tags through the implementation 302. Once the user is done, the user may select a save and close button 318 to save the new tags added to the first section 304 and to close the implementation 302.

Figure 4:
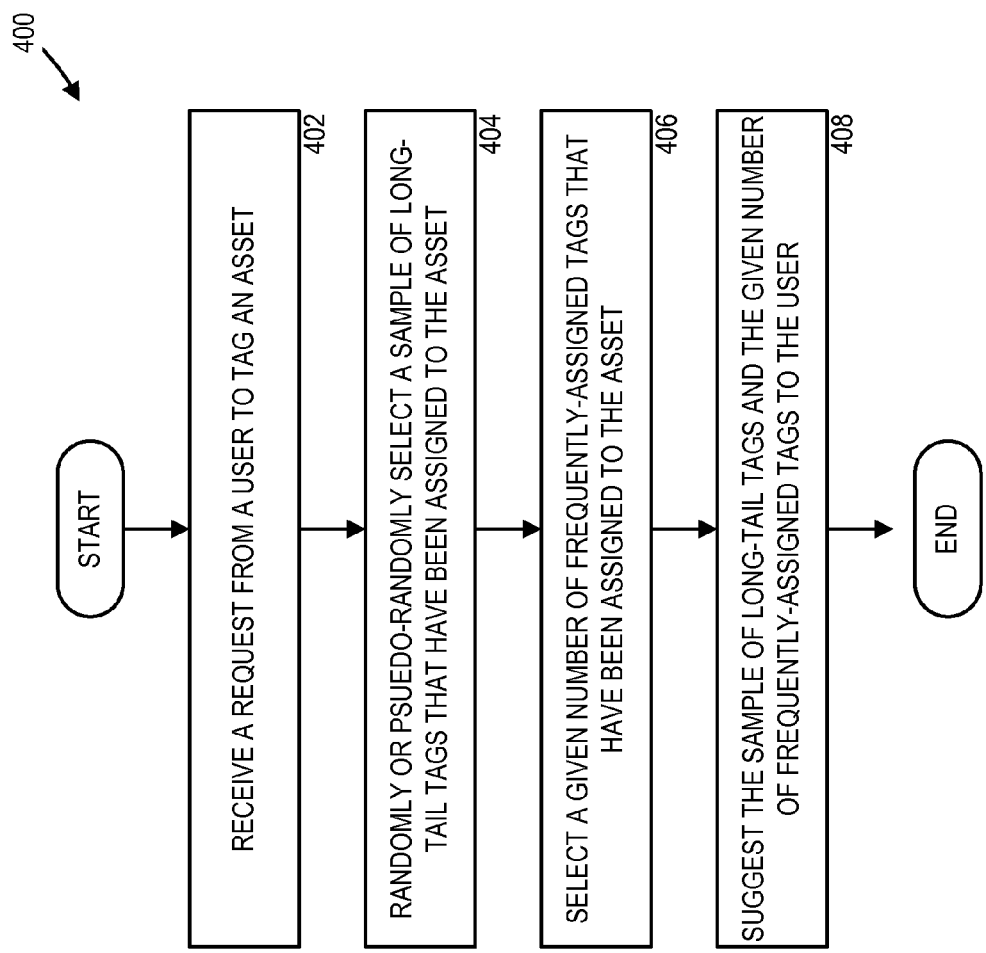
FIG. 4 is a flow diagram showing an illustrative process for suggesting long-tail tags, in accordance with one embodiment.

Turning now to FIG. 4, additional details will be provided regarding the operation of the tag suggestion module 114. In particular, FIG. 4 is a flow diagram illustrating aspects of one method provided herein for suggesting long-tail tags. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. It should be appreciated that more or fewer operations may be performed than shown in the figures and described herein. These operations may also be performed in a different order than those described herein.

Referring to FIG. 4, a routine 400 begins at operation 402, where the tag suggestion module 114 receives a request from a user to tag an asset. For example, the user may access an interface element, such as button or a menu, on the tag interface 102 to assign a tag to the asset. The routine 400 proceeds to operation 404, where the tag suggestion module 114 randomly or pseudo-randomly selects a sample of long-tail tags from a plurality of tags stored in the tag database 112. As previously mentioned, a plurality of tags stored in the tag database 112 may be divided, at least conceptually, into groups of frequently-assigned tags, long-tail tags, and rarely-assigned tags. The frequently-assigned tags have been assigned to the asset at a higher or the highest frequency, while the rarely-assigned tags have been have been assigned to the asset at a lower or the lowest frequency. The long-tail tags have been assigned to the asset at a frequency between the frequently-assigned tags and the rarely-assigned tags.

It should be appreciated that the tag database 112 may or may not differentiate between frequently-assigned tags, long-tail tags, and rarely-assigned tags. That is, the tag suggestion module 114 may extract frequently-assigned tags, long-tail tags, or rarely-assigned tags from a single database containing a plurality of tags of mixed categories. Alternatively, the tag suggestion module 114 may extract frequently-assigned tags, long-tail tags, and rarely-assigned tags from separated portions of the database containing frequently-assigned tags, long-tail tags, and rarely-assigned tags, respectively.

The routine 400 proceeds to operation 406, where the tag suggestion module 114 selects a given number of frequently-assigned tags from a plurality of tags stored in the tag database 112. In one embodiment, the tag suggestion module 114 selects the most frequently-assigned tags. In this way, the user is provided with the most popular tags based on input by other users. Once the tag suggestion module 114 has selected the sample of long-tail tags and the given number of frequently-assigned tags, the routine 400 proceeds to operation 408.

At operation 408, the tag suggestion module 114 suggests the sample of long-tail tags and the given number of frequently-assigned tags to the user. For example, the tag suggestion module 114 may provide the sample of long-tail tags and the given number of frequently-assigned tags in the tag interface 102 via the web server application 109 and the tag interface application 116. In particular, the tag interface application 116 may render the sample of long-tail tags and the given number of frequently-assigned tags for display on the tag interface 102. Upon receiving the tag suggestions from the tag suggestion module 114, the user may either select one of the suggested tags or manually enter a new tag to assign to the given asset.

Figure 5:
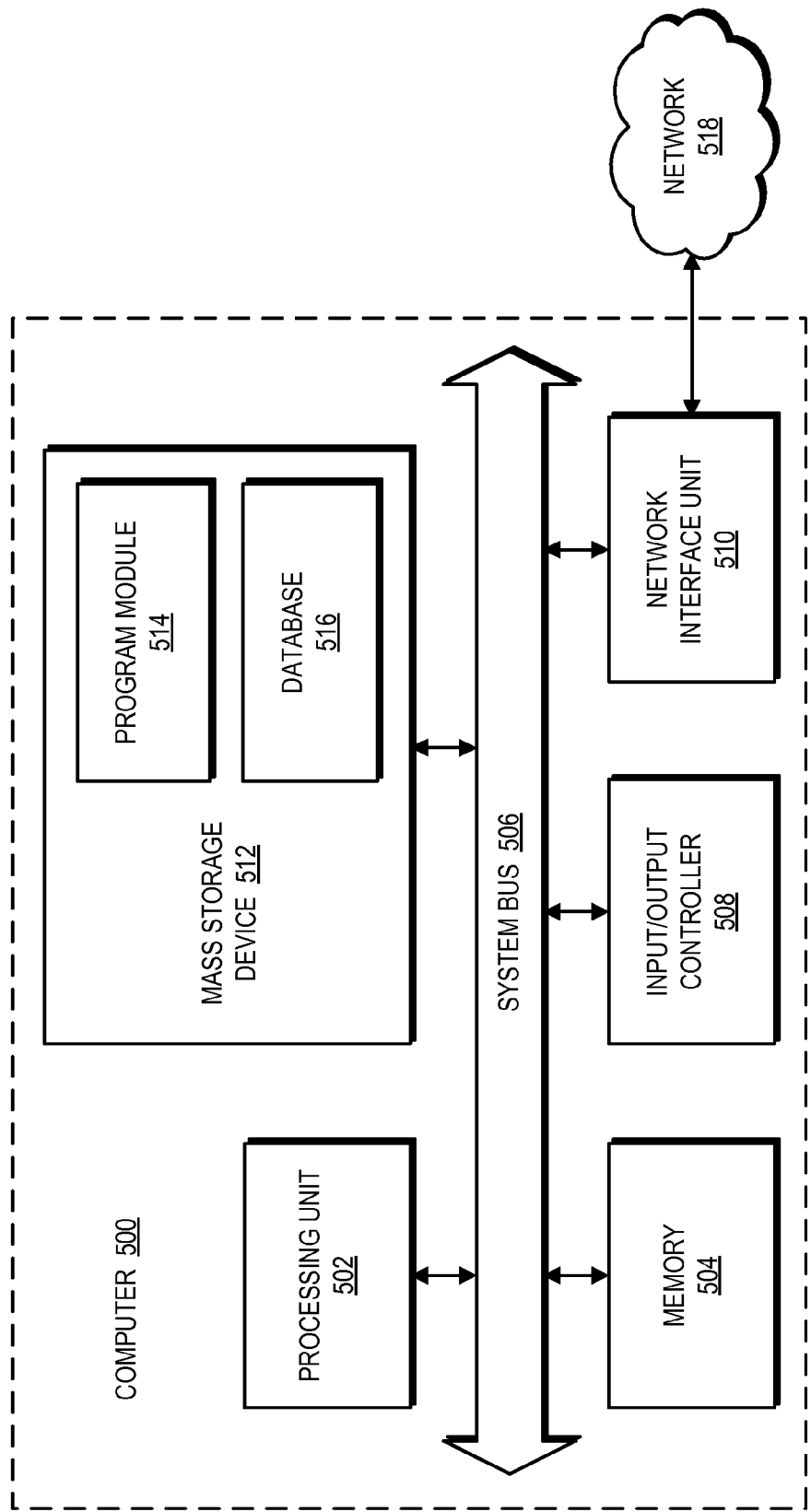
FIG. 5 is a computer architecture diagram showing aspects of an illustrative computer hardware architecture for a computing system capable of implementing aspects of the embodiments presented herein.

Referring now to FIG. 5, an exemplary computer architecture diagram showing aspects of a computer 500 is illustrated. Examples of the computer 500 may include server computer 104 and the client computer 106. The computer 500 includes a processing unit 502 ("CPU"), a system memory 504, and a system bus 506 that couples the memory 504 to the CPU 502.

The computer 500 further includes a mass storage device 512 for storing one or more program modules 514 and one or more databases 516. Examples of the program modules 514 may include the web server application 109, the tag suggestion module 114, and the tag interface application 116. Examples of the databases 516 may include the asset database 110 and the tag database 112. The mass storage device 512 is connected to the CPU 502 through a mass storage controller (not shown) connected to the bus 506. The mass storage device 512 and its associated computer-readable media provide non-volatile storage for the computer 500. Although the description of computer-readable media contained herein refers to a mass storage device, such as a hard disk or CD-ROM drive, it should be appreciated by those skilled in the art that computer-readable media can be any available computer storage media that can be accessed by the computer 500.

By way of example, and not limitation, computer-readable media may include volatile and non-volatile, removable and non-removable media implemented in any method or technology for storage of information such as computer-readable instructions, data structures, program modules, or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 500.

According to various embodiments, the computer 500 may operate in a networked environment using logical connections to remote computers through a network 518. An example of the network 518 is the network 108. The computer 500 may connect to the network 518 through a network interface unit 510 connected to the bus 506. It should be appreciated that the network interface unit 510 may also be utilized to connect to other types of networks and remote computer systems. The computer 500 may also include an input/output controller 508 for receiving and processing input from a number of input devices (not shown), including a keyboard, a mouse, a microphone, and a game controller. Similarly, the input/output controller 508 may provide output to a display or other type of output device (not shown).

Based on the foregoing, it should be appreciated that technologies for suggesting long-tail tags are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for suggesting a long-tail tag, the method comprising computer-implemented operations for:

identifying, by a computer having a processor and a memory, a first group of tags from a plurality of tags, the first group of tags comprising frequently-assigned tags having a higher frequency of being assigned to an asset;

identifying, by the computer, a second a group of tags from the plurality of tags, the second group of tags comprising long-tail tags having a lower frequency of being assigned to the asset than the frequently-assigned tags in the first group of tags;

suggesting, by the computer, the frequently-assigned tags and a sample of the long-tail tags to a user upon receiving a request from the user to tag the asset;

identifying, by the computer, a third group of tags from the plurality of tags, the third group of tags comprising rarely-assigned tags having a lower frequency of being assigned to the asset than the long-tail tags in the second group of tags, tracking, by the computer and over a given number of chances, a number of times that a tag in the second group has been assigned to the asset when the tag is suggested;

determining, by the computer, whether the number of times that the tag has been suggested to the user surpasses a first threshold;

wherein the first threshold comprises a minimum number of times for the tag to be assigned to the asset in order for the tag to be considered one of the frequently-assigned tags, upon determining that the number of times that the tag has been suggested to the user surpasses the first threshold, removing, by the computer, the tag from the second group of tags and adding the tag into the first group of tags;

determining whether the number of times that the tag has been suggested to the user falls below a second threshold;

wherein the second threshold comprises a maximum number of times for the tag to be assigned to the asset in order for the tag to be considered one of the rarely-assigned tags, and upon determining that the number of times that the tag has been suggested to the user falls below the second threshold, removing the tag from the second group of tags and adding the tag into the third group of tags.

2. The computer-implemented method of claim 1, wherein each of the plurality of tags comprises one or more keywords.

3. The computer-implemented method of claim 1, wherein identifying a first group of tags from a plurality of tags comprises identifying a first percentage of tags that have a highest frequency of being assigned to the asset, wherein identifying a third group of tags from the plurality of tags comprises identifying a second percentage of tags that have a lowest frequency of being assigned to the asset, and wherein identifying a second a group of tags from the plurality of tags comprises identifying the tags remaining between the first percentage of tags and the second percentage of tags.

4. The computer-implemented method of claim 1, wherein suggesting the frequently-assigned tags and a sample of the long-tail tags to a user upon receiving a request from the user to tag the asset comprises:

selecting, by the computer, a given number of most frequently-assigned tags; and randomly or pseudo-randomly selecting, by the computer, the sample of the long-tail tags.

5. The computer-implemented method of claim 1, wherein suggesting the frequently-assigned tags and a sample of the long-tail tags to a user upon receiving a request from the user to tag the asset comprises providing, by the computer, the frequently-assigned tags and the sample of the long-tail tags via a web server application over a network for display by a remote computer.

6. A computer-based system for suggesting a long-tail tag, comprising:
   a computer having a processor and a memory;
   a web server application executed by the computer and adapted to communicate with a remote computer over a network;
   a database coupled to the computer and adapted to store a plurality of tags and a number of times each of the plurality of tags has been assigned to an asset;
   a tag suggestion module executed by the computer and adapted to suggest, via the web server application, frequently-assigned tags having a higher frequency of being assigned to the asset and a sample of long-tail tags having a lower frequency of being assigned to the asset than the frequently-assigned tags;
   wherein the tag suggestion module is further adapted to divide the plurality of tags into a first group containing the frequently-assigned tags having a higher frequency of being assigned to the asset, a second group containing the long-tail tags having a lower frequency of being assigned to the asset than the frequently-assigned tags in the first group, and a third group containing rarely-assigned tags having a lower frequency of being assigned to the asset than the long-tail tags in the second group,
   wherein the tag suggestion module is further adapted to track, over a given number of chances, a number of times that a tag in the second group has been assigned to the asset when the tag is suggested;
   wherein the tag suggestion module is further adapted to remove the tag from the second group and to add the tag to the first group upon determining that a number of times that the tag has been assigned to the asset exceeds a first threshold, and wherein the tag suggestion module is further adapted to remove the tag from the second group and to add the tag to the third group upon the determining that the number of times that the tag has been assigned to the asset falls below a second threshold,
   wherein the first threshold comprises a minimum number of times for the tag to be assigned to the asset in order for the tag to be considered one of the frequently-assigned tags,
   wherein the second threshold comprises a maximum number of times for the tag to be assigned to the asset in order for the tag to be considered one of the rarely-assigned tags.

7. The computer-based system of claim 6, wherein the first group of tags comprises a first percentage of tags from the plurality of tags having a highest frequency of being assigned to the asset, wherein the third group of tags comprises a second percentage of tags from the plurality of tags having a lowest frequency of being assigned to the asset, and wherein the second a group of tags comprises a remaining percentage of tags between the first group of tags and the third group of tags.

8. The computer-based system of claim 6, wherein the tag suggestion module is further Currently Amended to randomly or pseudo-randomly select the sample of the long-tail tags.

9. The computer-based system of claim 6, wherein each of the tags comprises one or more keywords.

10. A non-transitory computer-readable medium having computer-executable instructions stored thereon which, when executed by a computer, cause the computer to:
    identify a first group of tags from a plurality of tags, the first group of tags comprising frequently-assigned tags having a higher frequency of being assigned to an asset;
    identify a second a group of tags from the plurality of tags, the second group of tags comprising long-tail tags having a lower frequency of being assigned to the asset than the frequently-assigned tags;
    identify a third group of tags from the plurality of tags, the third group of tags comprising rarely-assigned tags having a lower frequency of being assigned to the asset than the long-tail tags;
    suggest the frequently-assigned tags and a sample of the long-tail tags to a user, while disregarding the rarely-assigned tags, upon receiving a request over a network from the user to the tag the asset;
    track, over a given number of chances, a number of times that a tag in the second group has been assigned to the asset when the tag is suggested;
    determine whether the number of times that the tag has been suggested to the user surpasses a first threshold;
    wherein the first threshold comprises a minimum number of times for the tag to be assigned to the asset in order for the tag to be considered one of the frequently-assigned tags,
    upon determining that the number of times that the tag has been suggested to the user surpasses the first threshold, remove the tag from the second group of tags and add the tag into the first group of tags;
    determine whether the number of times that the tag has been suggested to the user falls below a second threshold;
    wherein the second threshold comprises a maximum number of times for the tag to be assigned to the asset in order for the tag to be considered one of the rarely-assigned tags, and
    upon determining that the number of times that the tag has been suggested to the user falls below the second threshold, remove the tag from the second group of tags and add the tag into the third group of tags.

11. The computer-readable medium of claim 10, wherein to suggest the frequently-assigned tags and a sample of the long-tail tags to a user upon receiving a request over the network from the user to tag the asset, the computer-readable medium has further computer-executable instructions stored thereon which, when executed by a computer, cause the computer to:
    select a given number of most frequently-assigned tags; and to
    randomly or pseudo-randomly select the sample of the long-tail tags.

12. The computer-readable medium of claim 10, wherein each of the tags comprises one or more keywords.

* * * * *